US009158923B2

(12) United States Patent
Guarnieri et al.

(10) Patent No.: US 9,158,923 B2
(45) Date of Patent: Oct. 13, 2015

(54) MITIGATING SECURITY RISKS VIA CODE MOVEMENT

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Har-Adar (IL)

(73) Assignee: International Business Machines Corporation, Armink, NY (US)

( * ) Notice: Subject to any disclaimer, the term of this patent is extended or adjusted under 35 U.S.C. 154(b) by 3 days.

(21) Appl. No.: 14/025,878

(22) Filed: Sep. 13, 2013

(65) Prior Publication Data
US 2014/0208430 A1    Jul. 24, 2014

Related U.S. Application Data

(63) Continuation of application No. 13/747,866, filed on Jan. 23, 2013, now abandoned.

(51) Int. Cl.
| | |
|---|---|
| *G06F 21/57* | (2013.01) |
| *G06F 21/52* | (2013.01) |
| *G06F 9/44* | (2006.01) |

(52) U.S. Cl.
CPC .............. *G06F 21/577* (2013.01); *G06F 8/72* (2013.01); *G06F 21/52* (2013.01)

(58) Field of Classification Search
CPC .......................... G06F 21/577; H04L 63/1433
USPC ............................................. 726/25; 717/113
See application file for complete search history.

(56) References Cited

U.S. PATENT DOCUMENTS

| | | | |
|---|---|---|---|
| 2006/0026283 A1 | 2/2006 | Trueba | |
| 2008/0052703 A1 | 2/2008 | Panjwani | |
| 2009/0205011 A1 | 8/2009 | Jain et al. | |
| 2010/0269096 A1* | 10/2010 | Araya et al. | 717/113 |
| 2011/0302566 A1* | 12/2011 | Abadi et al. | 717/168 |

OTHER PUBLICATIONS

Shi, "Static Analysis for Computing Escapability and Mutability for Java Components", 2005, IEEE, p. 1-10.*
Ruthing, "Bidirectional Data Flow Analysis in Code Motion: Myth and Reality", 1998, Springer-Verlag, p. 1-16.*
Sun, "Extending Static Analysis by Mining Project-Specific Rules", Jan. 1, 2012, IEEE, p. 1054-1063.*

(Continued)

*Primary Examiner* — Thanhnga B Truong
*Assistant Examiner* — Gregory Lane
(74) *Attorney, Agent, or Firm* — Harrington & Smith (57) ABSTRACT

A method includes performing on a computing system a source-to-sink reachability analysis of code of an application. The reachability analysis is performed using a static analysis of the code and determines flows from sources of information to sinks that use the information. The method includes determining scopes for corresponding security sensitive operations using the determined flows, each of the security sensitive operations corresponding to statements in the code and one or more flows. A scope for a security sensitive operation includes a block of statements in the code that correspond to a set of one or more flows ending at a sink. The method includes, for each of one or more selected scopes, moving statements in a corresponding block of statements that are independent of a security sensitive operation in the block to code before or after the block. Apparatus and program products are also disclosed.

21 Claims, 6 Drawing Sheets

(56) References Cited

OTHER PUBLICATIONS

SecureScout Microsoft IIS Memory Request Vulnerability (MS07-041/939373) (Remote File Checking), 2003-2010 NexantiS Corporation (www.securescout.com) (2 pages).

Express (Distributed platforms and Windows), Version 6.0x > Reference . Troubleshooting tips, last updated: Sep. 20, 2010, http://www14.software.ibm.com/webapp/wsbroker/redirect?version=vela&product=was-express-dist&topic=rtrb_httpsessprobs File name: rtrb_httpsess.probs.html (3 pages).

Abadi et al., "Automatically Fixing Security Vulnerabilities in Java Code", Splash '11 Companion, Oct. 22-27, 2011, Portland Oregon, USA. ACM 978-1-4503-0940-01/11/10. (2 pages).

* cited by examiner

FIG. 1

```
String name = request.getParameter("name");          ← 1
int account = DBUtil.Select("account").Where(name);  ← 2
String renderingPrefs = request.getParameter(
    "renderingPreferences");                         ← 3
RenderingPrefs rprefs =
    RenderingPrefs.parse(renderingPrefs);            ← 4
request.getSession().setAttribute(
    "userData", name + ";" + account);               ← 5
```

```
String renderingPrefs = request.getParameter(
        "renderingPreferences");
RenderingPrefs rprefs =
        RenderingPrefs.parse(renderingPrefs);
String name = request.getParameter("name");
int account = DBUtil.Select("account").where(name);
request.getSession().setAttribute(
        "UserData", name + ":" + account);
```

MITIGATING SECURITY RISKS VIA CODE MOVEMENT

CROSS-REFERENCE TO RELATED APPLICATIONS

This patent application is a continuation of U.S. patent application Ser. No. 13/747,866, filed on Jan. 23, 2103, which is incorporated herein by reference in its entirety to provide continuity of disclosure.

BACKGROUND

This invention relates generally to analysis of application code and, more specifically, relates to mitigating security risks via code movement.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Web applications, as well as web services, are continuously exposed to security threats. These include (i) injection attacks, where a malicious user injects malicious code into the application through web parameters, database hijacking, and the like, (ii) information leakage, where the application leaks confidential data, and (iii) denial-of-service and other attacks.

A standard way of addressing security vulnerabilities at compile time is to apply static security analysis to the subject application. A static security analysis is performed by analyzing rode of the subject application without executing the subject application. The goal of a static security scanner performing the static security analysis is to report all potential vulnerabilities within the application due to flow of untrusted data into security-sensitive operations (e.g., the value of an HTTP parameter flowing into a database query without first being validated or sanitized).

However, a wide range of security threats typically lie outside the scope of static security analysis, being too complex to reason about statically. These include the following:

1) rare instances of information leakage;
2) complex code-execution attacks;
3) multi-step heap spraying attacks; and
4) the ability to mount insecure direct object reference attacks under certain specific circumstances.

These threats, far from being contrived, find their expression in the wild. For example, WebSphere (which is software for service-oriented architecture environments that enables dynamic, interconnected business processes, and delivers highly effective application infrastructures for all business situations) admits a rare instance of in information leakage:

In rare situations, usually due to application errors, session data intended fix one client might be seen by another client. This situation is referred to as session data crossover. When the DebugSessionCrossover custom property is set to true, code is enabled to detect and log instances of session data crossover. Cheeks are performed to verify that only the session associated with the request is accessed or referenced. Messages are logged if any discrepancies are detected. These messages provide a starting point for debugging this problem. This additional checking is only performed when running on the WebSphere-managed dispatch thread, not on any user-created threads.

As another example, IIS (a web server application and set of feature extension modules) was also found to be vulnerable to a sophisticated remote-code-execution attack that is hard to uncover using static analysis. Other examples abound.

The growing need to protect web applications against threats like the above, which lie outside the scope of existing static security-scanning solutions—where the focus is on unchecked data flows from "sources" (statements reading (untrusted) user-provided input) to "sinks" (security-sensitive operations)—has not yet been addressed by commercial security tools.

BRIEF SUMMARY

The following summary is merely intended to be exemplary. The summary is not intended to limit the scope of the claims.

In an exemplary embodiment, a method includes performing on as computing system a source-to-sink reachability analysis of code of an application, wherein the source-to-sink reachability analysis is performed using a static analysis of the code and determines flows from sources of information to sinks that use the information. The method also includes determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at a sink. The method further includes, for each of one or more selected scopes, moving statements in a corresponding block of statements that are independent of a security sensitive operation in the block to a section of code before or after the block.

In another exemplary embodiment, an apparatus includes means for performing on a computing system a source-to-sink reachability analysis of code of an application, wherein the source-to-sink reachability analysis is performed using a static analysis of the code and determines flows from sources of information to sinks that use the information; means for determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at a sink; and means, for each of one or more selected scopes, for moving statements in a corresponding block of statements that are independent of a security sensitive operation in the block to a section of code before or after the block.

In a further exemplary embodiment, a computing system includes one or more memories storing computer-readable code and one or more processors. The one or more processors are configured in response to executing the computer-readable code to cause the computing system to perform: performing on a computing system a source-to-sink reachability analysis of code of an application, wherein the source-to-sink reachability analysis is performed using a static analysis of the code and determines flows from sources of information to sinks that use the information; determining scopes for corresponding security sensitive operations using the determined flows, each of the security sensitive, operations corresponding to statements in the code and one or more flows, wherein a scope for a security sensitive operation comprises a block of statements in the code that correspond to a set of one or more flows ending at a sink; and for each of one or more selected scopes, moving statements in a corresponding block of statements that are independent, of a security sensitive operation in the block to a section of code before or after the block.

An additional exemplary embodiment is a computer program product comprising a computer readable storage medium having program code embodied therewith. The program code is executable by a computing system to cause the computing system to perform: performing on a computing system a source-to-sink reachability analysis of code of an application, wherein the source-to-sink teachability analysis is performed using a static analysis of the code and determines flows from sources of information to sinks that use the information; determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at a sink; and for each of one or more selected scopes, moving statements in a corresponding block of statements that are independent of a security sensitive operation in the block to a section of code before or after the block.

DETAILED DESCRIPTION

As stated above, there is a growing need to protect web applications against threats that lie outside the scope of existing static security-scanning solutions. Exemplary embodiments herein take steps toward enhancing security analysis tools, such that the enhanced tools mitigate security threats that lie beyond insecure data-flow vulnerabilities. An exemplary technique is (i) to identify security-sensitive areas within an application, and (ii) to reduce the computations performed within these areas, so as to minimize the exposure of the application to security threats. The exemplary embodiments move code from the security-sensitive areas within the computations to areas outside the security-sensitive areas. Examples of JAVA (a programming language and computing platform first released by Sun Microsystems in 1995) code and movement are provided below after an overview of an exemplary computing system suitable for use with the exemplary embodiments.

Figure 1:
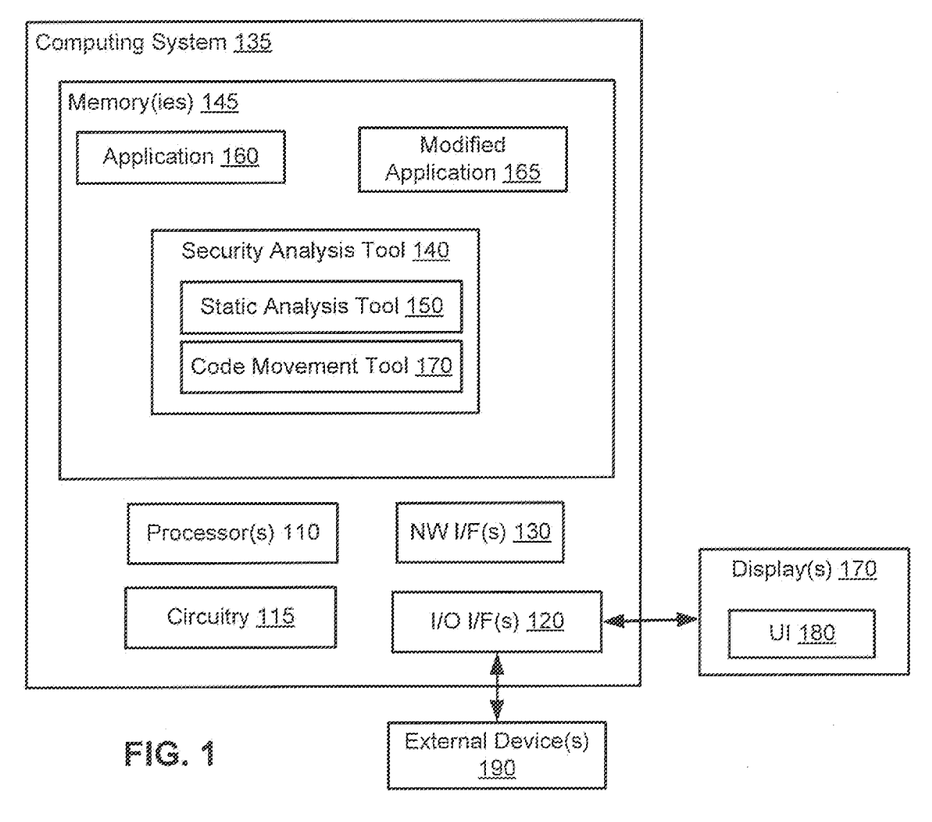
FIG. 1 is a block diagram of an exemplary computing system suitable for use for practicing exemplary embodiments of the invention.

Referring to FIG. 1, this figure is an overview of a computing system 135 suitable far use with exemplary embodiments herein. The computing system 135 comprises one or more memories 145, one or more processors 110, one or more I/O interfaces 120, and one or more wired or wireless network interfaces 130. The computing system 135 is coupled to or includes one or more displays 170 and one or more external device(s) 190. This example provides an application 160 and modified application 165 in the one or more memories 160. The one or more memories 145 also include a security analysis tool 140 as, in an exemplary embodiment, computer-readable program code that is executable by the one or more processors 110 to cause the computing system 135 to perform one or more of the operations described herein. In another example, the operations may also be performed, in part or completely, by circuitry 115 that implements logic to carry out the operations. The circuitry 115 may be implemented as part of the one or inure processors 110 or may be separate from the one or more processors 110. The processors 110 may be any processing unit, such as a digital signal processor and/or single-core or multi-core general purpose processors. The circuitry 115 may be any electronic circuit such as an application specific integrated circuit or programmable logic. The memories 145 may comprise non-volatile and/or volatile RAM, cache memory, NAND-based flash memory, long term storage (e.g., hard drive), and/or read only memory. The one or more I/O interfaces 143 may include interfaces through which a user may interact with the computing system 135. The display(s) 170 may be a touchscreen, flatscreen, monitor, television, projector, as examples. A use interacts with the security analysis tool 140 through the UI 180. The external device(s) 190 enable a user to interact with the computing system 135 and may include a mouse, trackball, keyboard, and the like. The network interfaces 142 may be wired or wireless and may implement a number of protocols, such as cellular or local area network protocols. The elements in computing system 135 may be interconnected through any technology, such as buses, traces on a board, interconnects on semiconductors, and the like.

In this example, the security analysis tool 140 includes a static analysis tool 150 and a code movement tool 170. The static analysis tool 150 performs an analysis of computer software in the application 160 that is performed without actually executing the application 160. In most cases, the analysis is performed on some version of the source code for the application 160, and in other cases some form of object code of the application 160. The code movement tool 170, in an exemplary embodiment, uses information from the static analysis tool 150 and performs operations thereon, as described in more detail below. The security analysis tool 140 operates on the application 160 to create a modified application 165.

Figure 2:
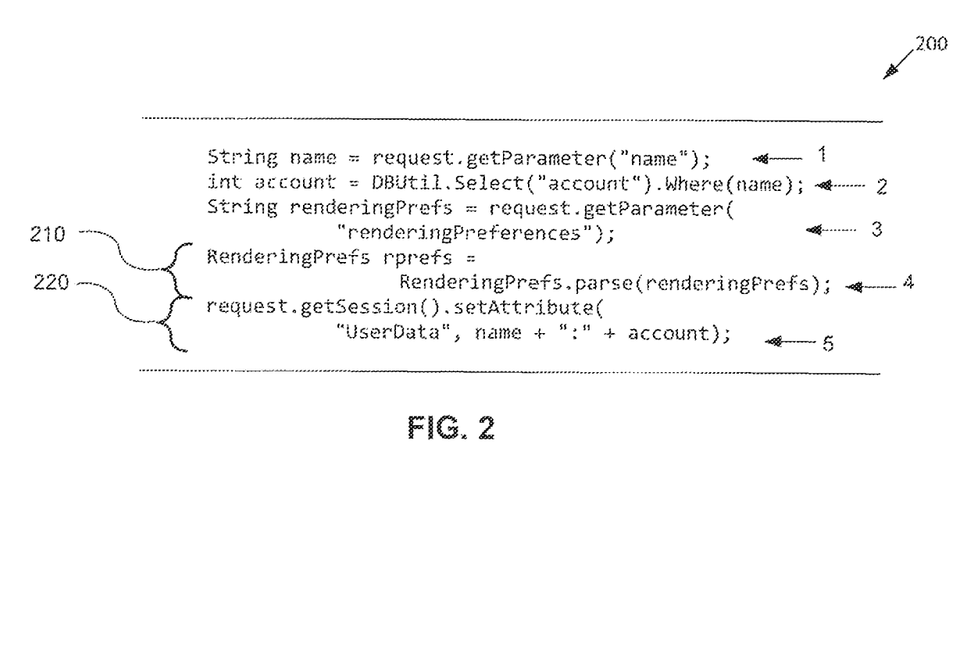
FIG. 2 is an example of a portion of code of an application written in JAVA.

An example of the instant invention is now presented using a simple illustrative example (in Java syntax) of portion of code 200 of an application 160, shown in FIG. 2. This example shows a standard piece of web code, where user-provided parameters are processed. Note that there are independent computations here. One computation 220 updates the session object based on the user's name and account number. Another computation 220 updates certain aspects of the web application's UI according to the user's preferences. The figure also illustrates an order from 1 to 5 in which the statements are made.

Figure 3:
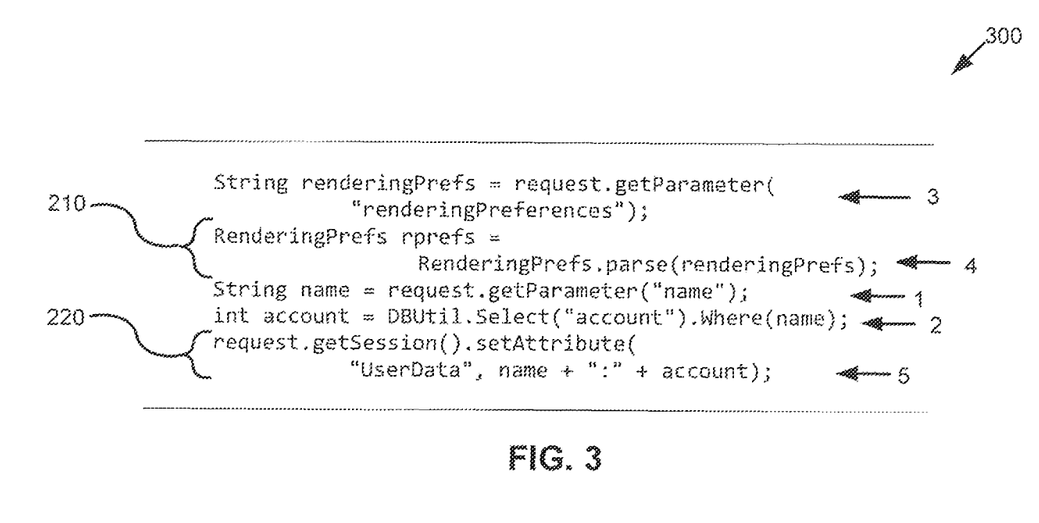
FIG. 3 is an example the portion of code from FIG. 2, written in accordance with an exemplary embodiment herein.

From a security standpoint, this code 200 is more vulnerable than is a rewritten transformation of the code 300 shown in FIG. 3. One difference is that the security-sensitive operation of placing sensitive user data within the session object (computation 220) occurs closer to the other statements (statements 1 and 2) that are related to this computation.

Specifically, lines 4 and 5 have been moved from their original locations in the original code 200 to locations that will be performed prior to lines 1, 2, and 5. This movement reduces the time frame in which the session stores the sensitive information from the user. Thus, an information-leakage vulnerability such as the one described above that occurs in WebSphere becomes less likely.

Detecting candidate transformations of this kind requires two capabilities. First, the analysis should be able to identify whether an operation is security sensitive. Second, the analysis should identify which portions of the code can safely be moved (i.e., without affecting the result of the computation), such that the duration of the security-sensitive computation (and consequently also its exposure to security threats) is reduced.

Figure 4:
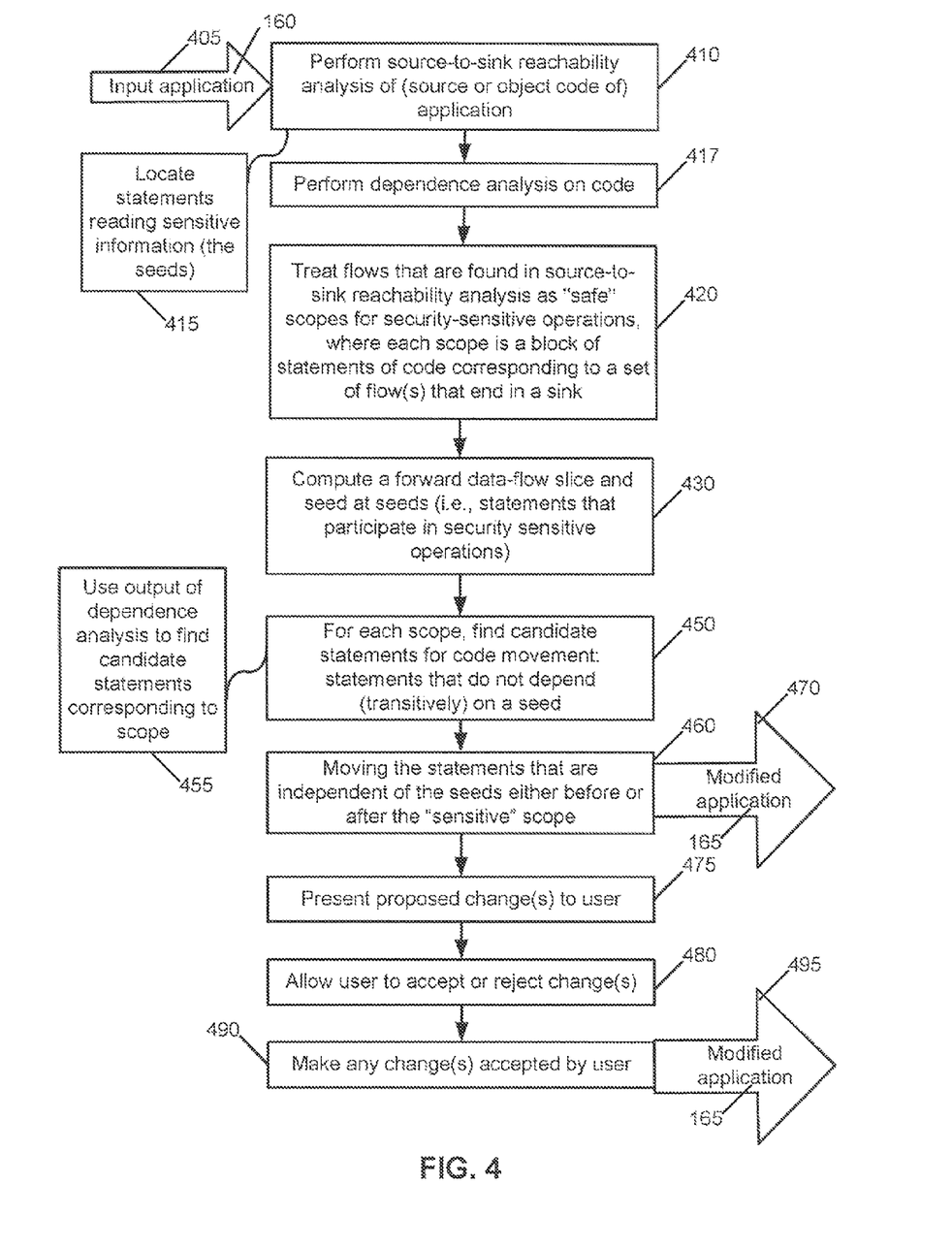
FIG. 4 is a logic flow diagram for mitigating security risks via code movement and illustrating operations performed by a data library service and illustrating the operation of an exemplary method, a result of execution of computer program instructions embodied on a computer readable memory, and/or functions performed by logic implemented in hardware, in accordance with an exemplary embodiment of this invention.

In what follows, it is explained how both of these challenges can be addressed using the existing machinery of data-flow analysis. For this explanation, FIG. 4 (along with other figures) may be referenced. FIG. 4 is logic flow diagram for mitigating security risks via code movement. Additionally, FIG. 4 illustrates operations performed by a data library service and illustrates the operation of an exemplary method, a result of execution of computer program instructions embodied on a computer readable memory, and/or functions performed by logic implemented in hardware, in accordance with an exemplary embodiment of this invention. The blocks in FIG. 4 are performed by the computing system 135, e.g., in response to execution of computer-readable code in the security analysis tool 140 by the processor(s) 110 or by implementation of appropriate circuitry 115, or a combination of both of these.

The first challenge of detection of security-sensitive operations is presently addressed. To detect security-sensitive operations, the source-to-sink reachability analysis of standard security analysis is applied. This occurs in block 410, where an input application 160 (accessed or input in operation 405) is operated on by the computing system 135 to perform source-to-sink read-lability analysis of (source or object code of the application 160. It is noted that block 410 further locates statements reading sensitive information. See block 415. The statements reading sensitive information are called the seeds herein. In an example, in order to determine how the seeds are related to each other and to other statements, a dependence analysis may be performed on the code (block 417). One possible output of the dependence analysis is a dependence graph, as shown in FIG. 5.

Figure 5:
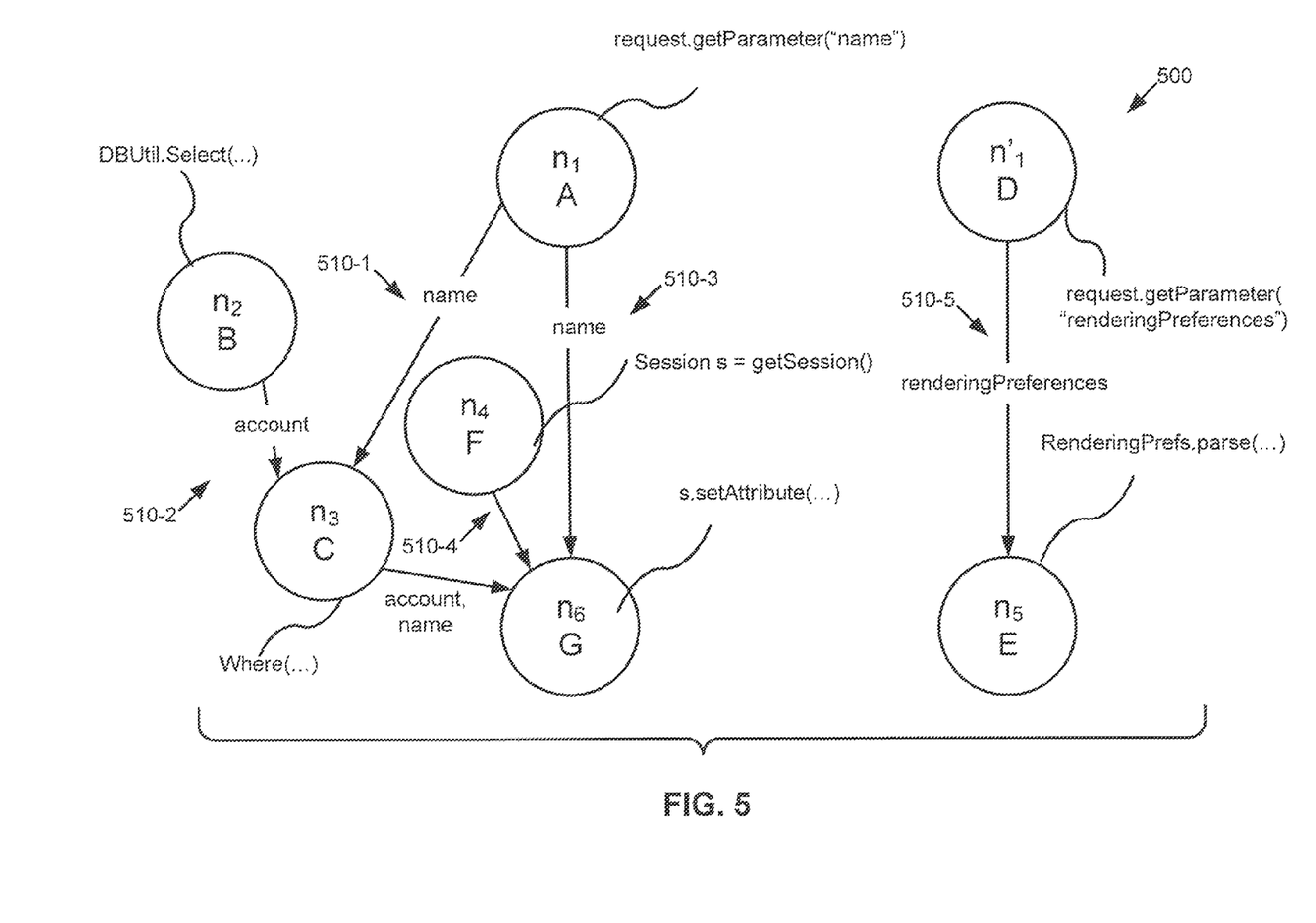
FIG. 5 is an example of a dependence graph corresponding to the code shown in FIG. 2.

Turning to FIG. 5 in addition to FIG. 2, FIG. 5 is an example of a dependence graph corresponding to the code shown in FIG. 2. This example of a dependence graph also illustrates data-flow dependencies between statements, Statement s is dependent on statement s' it statement s reads a memory location written by the statement s', or the statement writes a memory location accessed by the statement s'. For example, in $\{x:=5; y:=x+1;\}$, there is a read-after-write dependency from the second statement ($y:=x+1$) to the first one ($x:=5$), and thus a connecting edge between their two corresponding nodes would exist in a dependence graph. To proceed with this standard notion of a dependence graph, the example in FIG. 2 may be broken into the following atomic, statements:

A) String name=request.getParameter( . . . )
B) ResultSet r1=DBUtil.select( . . . )
C) ResultSet r2=r1.where( . . . )
D) String renderingPrefs=request.getParameter( . . . )
E) RenderingPrefs rprefs=RenderingPrefs.parse( . . . )
F) Session s=request.getSession( )
G) s.setAttribute( . . . )

The atomic statements A-G above correspond to the following statements from FIG. 2: atomic statement A corresponds to code statement 1; atomic statements B and C correspond to code statements 2; atomic statement D corresponds to code statement 3; atomic statement F corresponds to code statement 4; and atomic statements F and G correspond to code statement 5.

This example presents a dependence graph 500 that includes six nodes, $n_1$ to $n_6$, corresponding to the code shown in FIG. 2. Each node corresponds to an atomic statement A-G, and (as described above) each code statement 1-5 corresponds to one or more of the atomic statements. Each node also corresponds to a method. There are a number of flows shown, such as the following flows 510-1 $\{n_1, n_3, n_6\}$, 510-2 $\{n_2, n_3, n_6\}$, 510-3 $\{n_1, n_6\}$, 510-4 $\{n_4, n_6\}$, and 510-5 $\{n_1', n_5\}$. Some of the flows correspond to a potential vulnerability, because taint flows from a source in the path to a sink in the path. A source is a potential input of taint, and a sink is a security sensitive operation. For instance, the node $n_1$, which corresponds to the request.getParameter("name") method, is a source of taint, because the parameter corresponding to "name" is being input into the application 160. This potential taint flows through the flow 510-1, which includes the nodes $\{n_1, n_3, n_6\}$, corresponding to the request.getParameter ("name"), Where( . . . ), and request.getSession( ).setAttribute( . . . ) methods. This potential taint also flows through the flow 510-2, which includes the nodes $\{n_1, n_6\}$, corresponding to the request.getParameter("name") and s.setAttribute( . . . ) methods. The sink in this example is node $n_6$, corresponding to the request.getSession( )setAttribute( . . . ) method. The node $n'_1$ is another call to request.getParameter( ) with a different variable, "renderingPreferences". The node $n'_1$, which corresponds to the request.getParameter("renderingPreferenees") method, is a source of taint, because the parameter corresponding to "renderingPreferences" is being input into the application 160. This potential taint flows through the flow 510-5, which includes the nodes $\{n'_1, n_5\}$, corresponding to the request.getParameter("renderingPreferences") and RenderingPrefs.parse( . . . ) methods. The dependence graph 500 in FIG. 5 is one way of representing and visualizing these flows 510, although other techniques may be used to represent (e.g., and visualize) flows 510.

The results of the source-to-sink reachability analysis in block 410 are not treated as security vulnerabilities. Rather, the flows 510 that are found are used to determine a "safe" scope for the security-sensitive operations. See blocks 420 of FIG. 4. The term "scope" refers to the lexical scope (e.g., a code block) "enclosing" a flow or as set of related flows ending at a sink. That is, the set of flow(s) 510 is contained within a block of statements in code. As related in block 420, flows 510-1, 510-2, 510-3, and 510-4 define a scope of the code 200, which in this example is all of the code 200 (from statement 1 to statement 5). That is, the code block for the scope is all of the code 200. In an exemplary embodiment, "irrelevant" statements are pulled outside this scope, as is shown in the examples herein. It should be noted that the flow 510-5 also defines a scope, which is the code block including statements 3 and 4.

It should be noted that in the example of FIG. 2, the flows (e.g., 510-1, 510-2, 510-3, 510-4) involving the flow from the getParameter("name") method to the s.setAttribute( . . . ) method may not be vulnerable (e.g., "name" is a known entity). Thus, existing security tools might not report these flows as vulnerabilities, nor would these tools attempt to track these flows. However, these flows 510-1, 510-3 define the scope of a sensitive operation with respect to the threats listed above, and specifically the possibility of information leakage.

Similarly, the flow 510-5 technically may not be a vulnerable flow (e.g., as "renderingPreferences" is a known entity).

The second challenge of detection of independent subcomputations is now addressed. Here, too, data-flow machinery is used, though in a manner slightly different from what is typically used in security tools. In this case, in block 430 of FIG. 4, a forward data-flow slice is computed and seeded by the statements that participate in security sensitive operations (those seeds identified in the previous blocks). That is, for a selected source node (e.g., $n_1$), for the flows 510-1, 510-2, 510-3, 510-4, a data-flow slice will incorporate the atomic statements A, B, C, F, and G (and correspondingly, code statements 1, 2, and 5).

Any statement in the continuation of the computation that is not part of the slice can safely be moved upwards, so as to reduce the time scope of the security-sensitive operation, thereby mitigating security risks involving the statement. In particular, in block 450, the computing system 135, for each scope, finds candidate statements for code movement. One exemplary technique for finding the candidate statements is to use results of the dependence analysis to find candidate statements corresponding to the scope (block 455). FIG. 5, for instance, illustrates that a dependence analysis using the dependence graph 500 would indicate that the atomic statements D and F (which correspond to the statements 3 and 4, respectively) may be moved.

It should be noted that the candidates are statements that do not depend (e.g., transitively) on a seed (that is, a statement participating in the security-sensitive operation). One can have not just a single flow, but a subgraph of dependence statements, as described above. Here is another example in addition to the example of FIGS. 2 and 5:

String s=source( ); String x=s+"abc"; String y=s+"def"; String z=sanitize(y); sink(x, z).

Here, the flow starting at [String s=source( );] reaches [String z=sanitize(y);], which does not lead to a vulnerable flow because of the sanitization operation. A transitive dependency occurs because the string z is created before, the sink, but the string z is assumed to be not vulnerable because of sanitization. However, it would be incorrect to move this statement outside this scope, because z is used in [sink(x, z);]. More specifically, transitivity is the mathematical property: $(a,b)*(b,c) \Rightarrow (a,c)$. For data-flow analysis, if there is data flow from statement A to statement B, and from statement B to statement C, then there is transitive data flow from statement A to statement C. So an exemplary idea is to find all the statements that have transitive dependencies with the statements participating in the vulnerable flow. These statements must stay where they are. Other, independent statements can be moved.

In block 460, the computing system 135 moves the statements that are independent of the seeds either before or after the "sensitive" scope, in block 470, the modified application 165 is output. This may involve, e.g., one or more of outputting to the one or more memories 145, or outputting to another computing system via the one or more network interfaces 130.

It should be noted that the source-to-sink reachability analysis of block 410 allows one to know which statements are related to the security-sensitive operation (where the statements participating in the flow(s) are the "seeding" statements). One can then check, via dependence analysis (see block 417), which other statements residing in the same scope are independent of these statements and move the independent statements out. Theoretically, one could perform the dependence analysis of block 417 first (to determine which statements are dependent upon one another), and then consult the resultant dependence graph with the flows that are obtained via a flow analysis (block 410). The order of computing the data flows and dependence graph should not matter.

Integration into existing tools is now described through examples. A final point—which concerns the commercial/practical value of the instant exemplary embodiments—is how to integrate the exemplary embodiments into existing tools. An exemplary way of doing this is by presenting a user with a visualization of the security-sensitive operation (e.g., superposed on the source code), as well as of the proposed code-movement transformation, and asking the user to review and accept the changes.

This interface is standard for IDE-based refactoring tools, but has not received enough attention from designers of security-related analyses (except SQL, which has a different focus). Thanks to this interface, the user can identify cases where the code is not vulnerable in the standard sense of static security analysis, but the proposed transformation can make the code more immune against sophisticated security threats.

Figure 6:
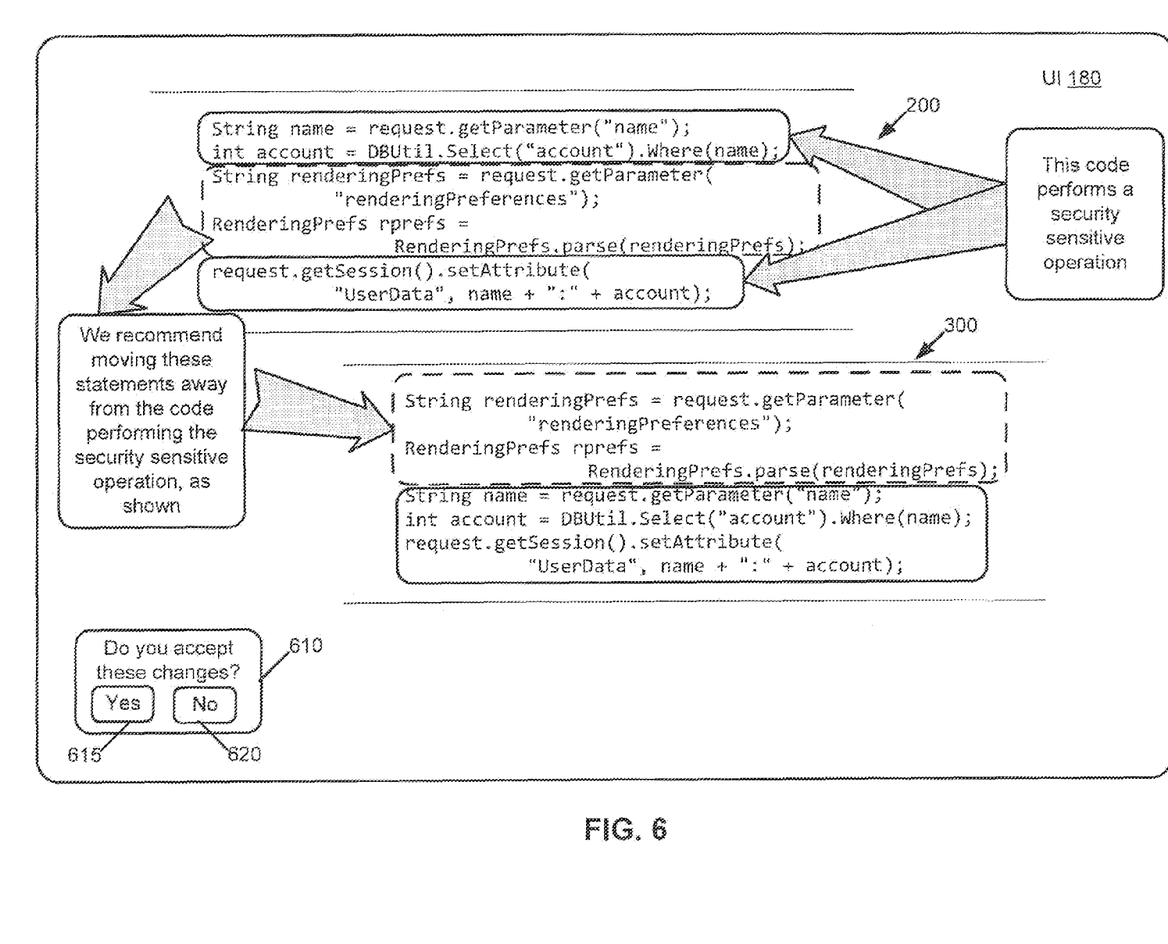
FIG. 6 illustrates a user interface that presents a visualization of code for a security-sensitive operation as well as of proposed code-movement transformation, and asks the user to review and accept the changes.

In this example, therefore, in FIG. 4, the modified application is output to the UI 180 in operation 470 and in block 475, the computing system 135 presents the proposed change(s) to user. Further, in block 480, the computing system 135 allows the user to accept or reject change(s). Turning to FIG. 6, this figure illustrates a user interface that presents a visualization of code for the security-sensitive operation as well as of a proposed code-movement transformation, and asks the user to review and accept the changes. The security sensitive scope is emphasized via the statement "This code performs a security-sensitive operation". There is also a statement indicating "We recommend moving these statements away from the code performing the security sensitive operation, as shown". Popup 610 allows the user to accept the changes via a "Yes" button 615 or reject the changes via a "No" button 620. Responsive to the user's input, in block 490, the computing system 135 makes any change(s) accepted by user, and in block 495, the computing system outputs the modified application 165 (e.g., assuming at least one change is accepted by the user).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including, instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed, elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronym that appear in the text or drawings are defined as follows.

API Application Programming Interface
HTTP HyperText Transmission Protocol
IIS Internet information Services
RAM Random Access Memory
UI User Interface

What is claimed is:

1. A computing system comprising:
one or more memories storing computer-readable code; and
one or more processors, configured in response to executing the computer-readable code to cause the computing system to perform:
performing on a computing system a source-to-sink reachability analysis of code of an application, wherein the source-to-sink reachability analysis is performed using a static analysis of the code and determines flows from sources of information to sinks that use the information;
determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at a sink; and
for each of one or more selected scopes, moving statements in a corresponding block of statements that are independent of a security sensitive operation in the block to a section of code before or after the block.

2. The apparatus of claim 1, wherein the one or more processors are further configured in response to executing the computer-readable code to cause the computing system to perform performing, prior to moving statements, a dependence analysis to determine statements in the block that are dependent on other statements in the block, wherein moving statements uses output of the dependence analysis in order to determine the statements in the corresponding block of statements that are independent of the security sensitive operation in the block to a section of code before or after the block.

3. The apparatus of claim 2, wherein a statement s is dependent on statement s' in response to statement s reading a memory location written by the statement s', or the statement s writing a memory location accessed by the statement s'.

4. The apparatus of claim 2, wherein the source-to-sink reachability analysis is performed before the dependence analysis.

5. The apparatus of claim 2, wherein the source-to-sink reachability analysis is performed after the dependence analysis.

6. The apparatus of claim 2, wherein performing a dependence analysis further comprises determining relationships between a plurality of atomic statements, wherein the atomic statements correspond to statements in the block.

7. The apparatus of claim 2, wherein the one or more processors are further configured in response to executing the computer-readable code to cause the computing system to perform:
  prior to moving statements, finding candidate statements in a block of statements for movement using output of the dependence analysis, and
  wherein moving statements further comprises moving the candidate statements that are independent of the security sensitive operations in the block to a section of code before or after the blocks.

8. The apparatus of claim 7, wherein finding candidate statements in a block of statements for movement further comprises finding, using results of the dependence analysis, candidate statements that do not transitively depend on statements in a corresponding security sensitive operation.

9. The apparatus of claim 1, wherein the one or more processors are further configured in response to executing the computer-readable code to cause the computing system to perform presenting on a display indication of the statements to be moved before or after the block and where the statements would be moved in the code, allowing the changes to be accepted or rejected by a user, and performing the moving the statements in response to a user accepting the changes.

10. The apparatus of claim 1, wherein the one or more processors are further configured in response to executing the computer-readable code to cause the computing system to perform outputting code comprising statements that were moved statements and statements that were not moved.

11. A computer program product comprising a non-transitory computer readable storage medium having program code embodied therewith, the program code executable by a computing system to cause the computing system to perform:
  performing on a computing system a source-to-sink reachability analysis of code of an application, wherein the source-to-sink reachability analysis is performed using a static analysis of the code and determines flows from sources of information to sinks that use the information;
  determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at a sink; and
  for each of one or more selected scopes, moving statements in a corresponding block of statements that are independent of a security sensitive operation in the block to a section of code before or after the block.

12. The computer program product of claim 11, wherein the program code executable by a computing system further causes the computing system to perform: prior to moving statements, performing a dependence analysis to determine statements in the block that are dependent on other statements in the block, wherein moving statements uses output of the dependence analysis in order to determine the statements in the corresponding block of statements that are independent of the security sensitive operation in the block to a section of code before or after the block.

13. The computer program product of claim 12, wherein a statement s is dependent on statement s' in response to statement s reading a memory location written by the statement s', or the statement s writing a memory location accessed by the statement s'.

14. The computer program product of claim 12, wherein the source-to-sink reachability analysis is performed before the dependence analysis.

15. The computer program product of claim 12, wherein the source-to-sink reachability analysis is performed after the dependence analysis.

16. The computer program product of claim 12, wherein performing a dependence analysis further comprises determining relationships between a plurality of atomic statements, wherein the atomic statements correspond to statements in the block.

17. The computer program product of claim 12, wherein the program code executable by a computing system further causes the computing system to perform:
  prior to moving statements, finding candidate statements in a block of statements for movement using output of the dependence analysis, and
  wherein moving statements further comprises moving the candidate statements that are independent of the security sensitive operations in the block to a section of code before or after the blocks.

18. The computer program product of claim 13, wherein finding candidate statements in a block of statements for movement further comprises finding, using results of the dependence analysis, candidate statements that do not transitively depend on statements in a corresponding security sensitive operation.

19. The computer program product of claim 11, wherein the program code executable by a computing system further causes the computing system to perform: presenting on a display indication of the statements to be moved before or after the block and where the statements would be moved in the code, allowing the changes to be accepted or rejected by a user, and performing the moving the statements in response to a user accepting the changes.

20. The computer program product 11, wherein the program code executable by a computing system further causes the computing system to perform: outputting code comprising statements that were moved statements and statements that were not moved.

21. A method comprising:
  performing on a computing system a source-to-sink reachability analysis of code of an application, wherein the source-to-sink reachability analysis is performed using a static analysis of the code and determines flows from sources of information to sinks that use the information;
  determining scopes for corresponding security sensitive operations using the determined flows, each of the security sensitive operations corresponding to statements in the code and one or more flows, wherein a scope for a security sensitive operation comprises a block of statements in the code that correspond to a set of one or more flows ending at, a sink; and for each of one or more selected scopes, moving statements in a corresponding block of statements that are independent of a security sensitive operation in the block to a section of code before or after the block.

* * * * *